March 15, 1932.  V. G. APPLE  1,849,263
DYNAMO ELECTRIC MACHINE FIELD ELEMENT AND METHOD OF MAKING IT
Filed July 12, 1927   3 Sheets-Sheet 1
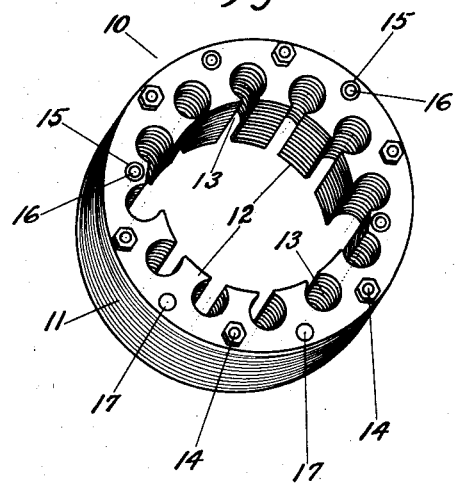
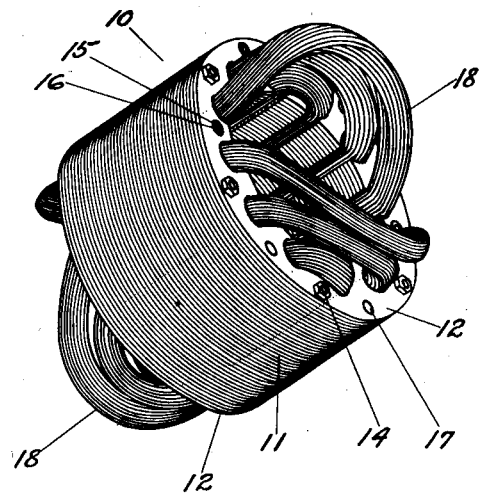
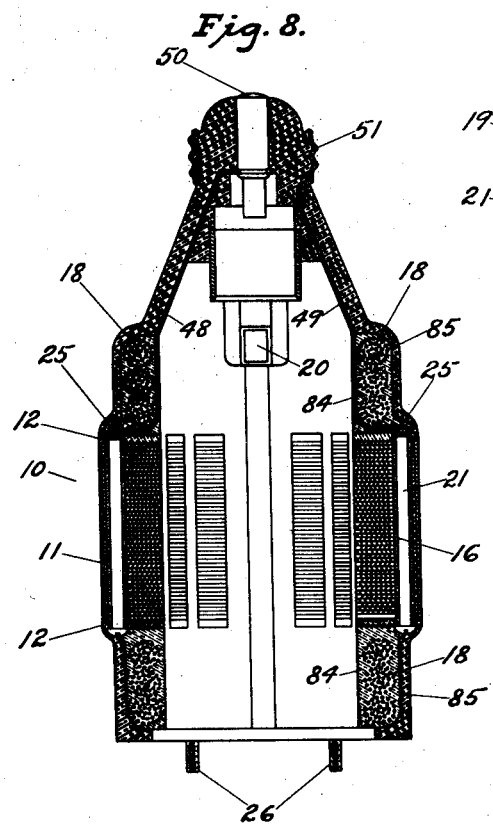
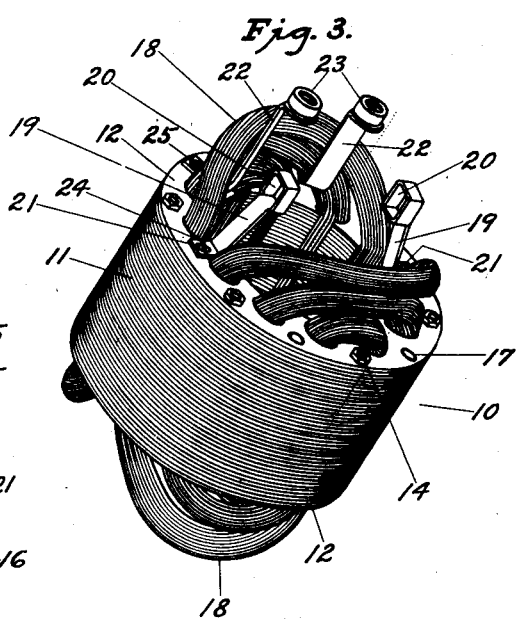
INVENTOR
Vincent G. Apple March 15, 1932. V. G. APPLE 1,849,263
DYNAMO ELECTRIC MACHINE FIELD ELEMENT AND METHOD OF MAKING IT
Filed July 12, 1927 3 Sheets-Sheet 2

INVENTOR
Vincent G. Apple

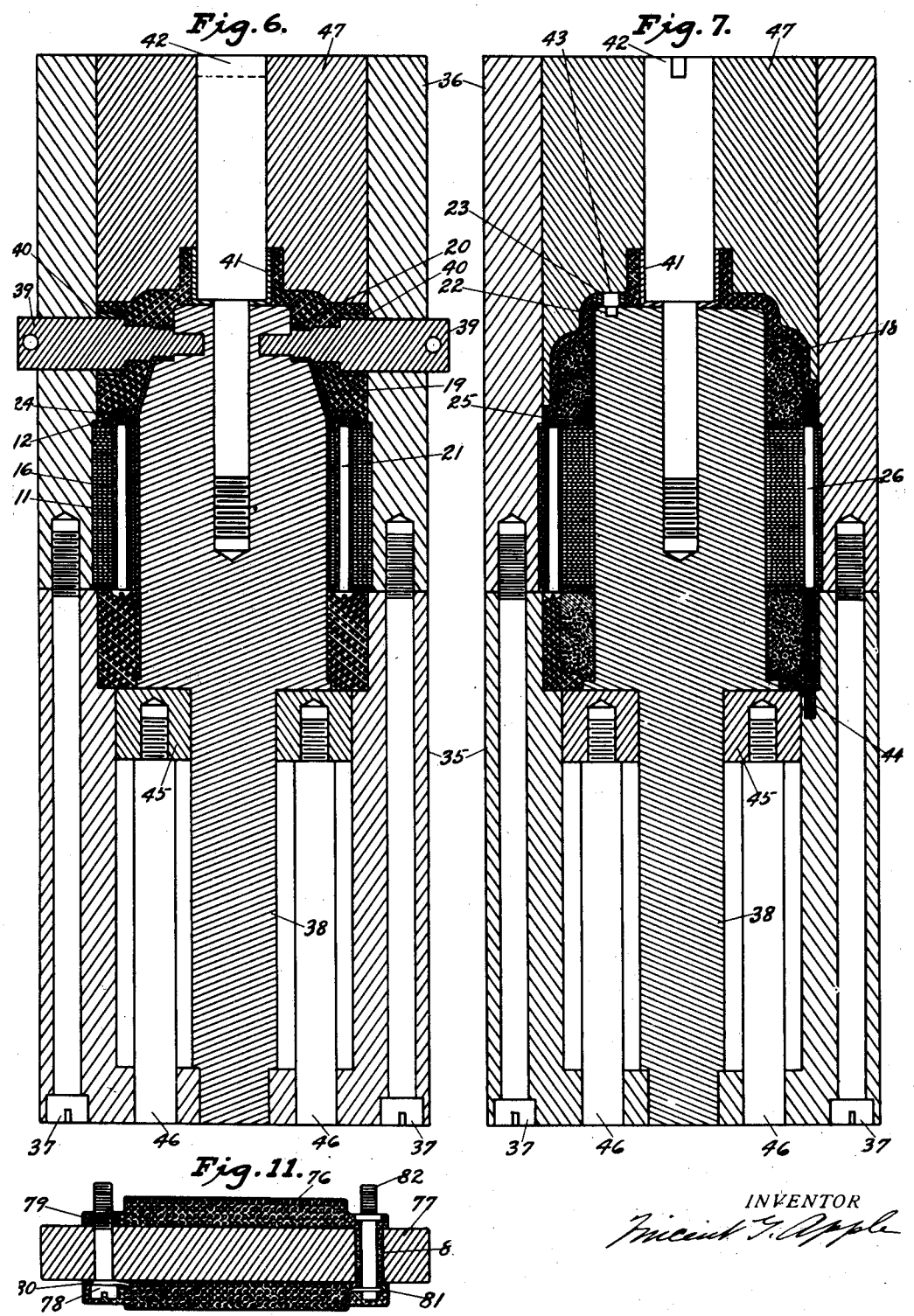

Patented Mar. 15, 1932

1,849,263

UNITED STATES PATENT OFFICE

VINCENT G. APPLE, OF DAYTON, OHIO

DYNAMO ELECTRIC MACHINE FIELD ELEMENT AND METHOD OF MAKING IT

Application filed July 12, 1927. Serial No. 205,253.

My invention relates to improvements in the wound elements of dynamo electric machines and similar devices and in the methods employed in applying windings thereto.

One of the objects of my invention is to provide a structure wherein the coils, and the necessary leads which connect them to their respective terminals, and the terminals themselves, all are imbedded in a rigid mass of insulating material, to the end that deterioration incident to vibration of the parts, where yielding windings and flexible leads are employed, will be eliminated.

Another object is to so enclose the conducting elements of the structure as to effectually protect them against deterioration from the action of oils, moisture, corrosive gases, etc., to which wound elements of the conventional type are subject.

Still another object is to so mould the insulating material that it will extend beyond the windings in such a manner as will provide support for other parts of the structure, to eliminate extra parts usually provided for that purpose.

Still another object is to provide a simple and efficient method of procedure to carry the other objects into effect.

I attain all the foregoing objects by the structure and method hereinafter described, reference being had to the drawings in which Figure 1 shows a laminated core for a dynamo electric machine.

Figure 2 shows the core with windings thereon.

Figure 3 shows the manner in which terminals are attached.

Figures 6 and 7 are cross sections taken thru another mold which I employ to add heavier masses of insulation to the structure when required.

Figure 8 is a cross section thru a field for a small motor where lamp socket terminals are substituted for the binding post terminals shown in Figures 3 to 7.

Figure 11 is a cross section thru another coil made by my improved method.

Similar numerals refer to similar parts thruout the several views.

Figure 4:
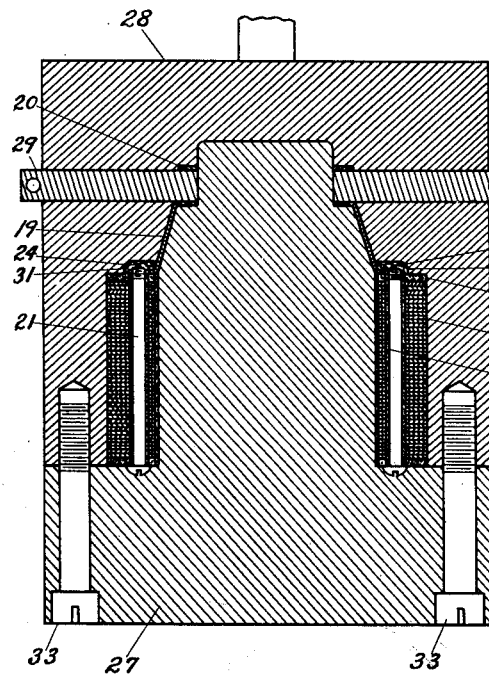
Figures 4 and 5 are cross sections taken thru a mold which I employ in impregnating the windings and applying a thin coating thereto.

The conventional method of applying windings to cores of dynamo electric machine elements consists, usually, in winding about the core, or into slots provided in the core, a suitable number of turns of wire covered with cotton or other insulating material, then dipping the wound elements into liquid insulating material, such as varnish, shellac, liquid bakelite, etc., and subsequently baking the varnish until hard.

A more thorough method employed in producing relatively small units consists in placing windings of insulated wire on cores, then further insulating the structure in an impregnating tank. This latter process consists in placing a considerable number of the wound elements into an air-tight tank, exhausting the air from the tank and consequently from the interstices between the layers of wire, then permitting the tank to fill with a liquid insulating material, and sometimes further applying pressure to the tank. Because of the vacuum created in the tank when the wound elements are within, there is a corresponding vacuum in the interstices of the winding and when the tank is allowed to fill with liquid the vacuum within the coils assists penetration of the coils by the liquid. If, now, that part of the insulating material only, which penetrated the coils, could be hardened without also hardening the entire body of liquid within which the coils are emersed, this process would be relatively perfect. But the coils must be withdrawn from the liquid, drained, then subjected to a baking temperature which boils out a great part of the liquid which previously penetrated the winding.

The impregnating process hereinafter described, and which is a step in the method of carrying out my present invention, consists in placing a single wound element in a mold, said mold when closed about the element being substantially filled by the core and winding, a relatively small space only being permitted between the winding and the walls of the mold cavity, then impregnating the winding by creating a vacuum in the cavity and drawing in liquid insulation, or by pumping it in by pressure, or both, hardening the insulation by baking the entire mass including the mold, core and winding, then removing the element from the mold.

Where certain insulating material which may be made sufficiently fluid to afford ready penetration is employed, large masses of it are not readily cured out, so that it is highly desirable that the cavity of the impregnating mold be a relatively close fit on the core and windings, so that the resulting thin sections of insulating material may be speedily cured, the larger masses of insulation which form a part of the completed element being then added by a subsequent operation consisting of moulding plastic insulating material of lesser mobility but which is more easily cured.

Dynamo electric machine elements and similar wound devices such as form the subject of the present invention, employ relatively fine wire for the coils, and the ends of these wires necessarily connect to brush holders by way of which the current is conveyed to the other wound element of the machine, or they connect to the external circuit, or to both. The conventional method employed for this purpose consists in attaching brush holders or binding posts or both to the frame of the machine and connecting them by more or less flexible leads to the ends of the windings.

A feature of the present invention consists in rigid connections between the binding posts and the coils and between the brush pockets and the coils, and a means of securing them which prevents their being loosened from the ends of the windings while the mass of more or less plastic insulation is being moulded about them.

Referring to the drawings, 10 is a core of magnetic material, composed of iron laminæ 11. Similarly shaped laminæ 12 of insulating material are placed at each end of the core. Winding apertures 13, Figure 1, extend axially thru the core. Bolts 14 extending thru small holes in the core may be used to temporarily hold the laminæ together, or the laminæ may be otherwise temporarily held. Holes 15 have tubular linings 16 of insulating material. Rivets 17 may extend thru the laminæ to hold them together at spaces not otherwise occupied.

After a core as shown in Figure 1 has been provided, coils 18 are placed thereon as in Figure 2. The coils shown are adapted and provide a bipolar field, but any reasonable number of poles may be provided by a suitable arrangement of the windings.

Figure 3 shows the terminals necessary for a direct current field and the method of securing them against displacement. Stampings 19, having brush pockets 20, are attached to core 10 by screws 21, which pass thru insulating tubes 16, Figure 1. Stampings 22, having binding post terminals 23 are attached in the same manner. The ends of the coils are preferably soldered or welded to these terminals. It is important that these joints be made at points which will be covered by the relatively thin coating of insulating material which is applied to the coils in the succeeding operation. Accordingly the coil ends are joined to the terminals as at 24 and 25. (See Figures 3, 4 and 5).

Figure 5:
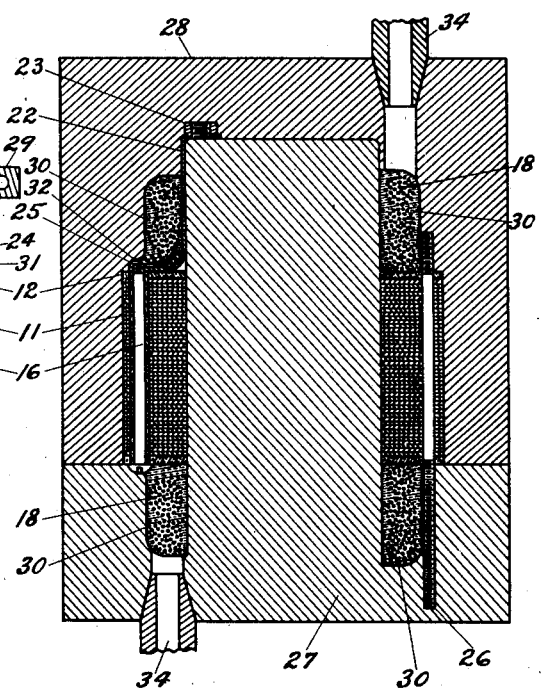

Bolts 14 are now removed and replaced with studs 26 adapted to extend beyond the end of the finished field for supporting a bearing head. The winding is then ready for impregnation, and Figures 4 and 5 are cross sections taken thru the mold provided for that purpose. Cross section Figure 4 is taken thru the mold so as to cut through brush terminal stampings 19, Figure 3, and the bolts 21 which secure them. The cross section Figure 5 is taken in such a manner that on one side it cuts thru a terminal stamping 22, while on the other side it cuts thru a bolt hole formerly occupied by a bolt 14, Figure 3, here replaced with a stud 26. The mold is in two main parts. Part 27 extends upwardly into the bore, while part 28 conforms to the outside of the core. Pull bars 29 extend into brush pockets 20 to exclude insulating material therefrom. Pockets 30 are cut in the mold to admit the coils. These pockets are but slightly larger than the space required by the coils themselves. Pockets 30 are connected by channels 31, which permit insulating material to cover the joints where the ends of the coils connect to terminals, as at 24, Figures 3 and 4. A slight extension of a pocket 30 as at 32 permits insulating material to cover joint 25, Figures 3 and 5. Screws 33 hold the two halves of the mold together. Pipes 34 are provided, one to exhaust the air from the mold and the other to subsequently admit the liquid insulation and apply pressure thereto, or, if pressure only is used, the vacuum pipe may be eliminated. After the liquid insulation is forced into the mold so as to fill the interstices in the winding and to slightly cover the winding and the joints between the winding and the terminals, the insulation is hardened, or allowed to harden, by heat or otherwise, depending on the nature of the insulating material used, then removed from the mold. Figures 4 and 5 show the mold after the insulating material has been forced into place and it will be seen that the wire, and the joints between the wire and terminals, are so located and secured that a slight bending of the terminals during subsequent operations will not loosen the joints.

Figure 10:
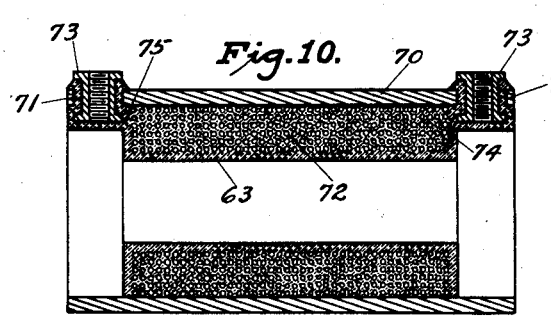
Figure 10 is a cross section thru a coil such as may be employed in a solenoid or similar device.

When a wound element for an electrical device has been impregnated as shown and described relative to Figures 4 and 5, it is not only protected from physical injury due to vibration and accidental impact against other bodies, but also against the deteriorating action of oils, moisture, corrosive gasses, etc., to which windings of the conventional type are subject, and while a further step in my process contemplates molding a heavier coating of insulating material about the structure in a subsequent operation, in many cases it may be found highly advantageous to impregnate a winding by the process described and using it without further molding operations. Thus the field structure when removed from mold (Figures 4 and 5) could be used to advantage in a frame which has been separately molded, either of insulating material or of metal, and Figures 10 and 11 show coils which have been completed, ready for use by this single impregnating operation. In order, however, to complete the field element shown in Figures 4 and 5 after removal from the mold there shown I provide a housing suitable for carrying bearings, terminals, brush tension springs, etc., of insulating material by placing the impregnated structure in another mold together with sufficient loose molding compound, subjecting the mold to sufficient temperature to bring the compound to a plastic state then closing the mold, all according to the well known molding process, except that the mold differs considerably from those commonly used.

Figures 6 and 7 are cross sections thru the mold which I employ to provide the housing. The mold is here shown closed, as it appears after a housing is formed, the plane of intersection of the core and winding being the same in Figure 6 as in Figure 4 and the same in Figure 7 as in Figure 5. The outer wall of the mold is divided into two parts 35 and 36. Part 36 is counterbored to receive the core 10, so that when part 35 is held in place by screws 37 the core is held against movement in the mold. A concentric plug 38 is secured in the bottom of part 35 and is enlarged at its upper end to fit the bore of the core. Plug 38 is also cut out at its upper end to give support to stampings 19 to prevent displacement from the molding pressure. Pull plugs 39 having support in plug 38 and in part 36 exclude the insulation from brush pockets 20 and at the same time form cylindrical openings in the insulation for brush springs. Metal inserts 40 placed over plugs 39 furnish suitable support within which brush spring caps may be held. A bearing sleeve 41 held in place by stud 42 provides a suitable housing for a ball bearing or, if desired, a plain bearing bushing may be held in the same manner or, the bearing at this end may be eliminated entirely and an armature supported from bearings secured at the open end. Studs 43 extend into terminals 23 to maintain their correct location. Studs 26 rest in pockets 44 in part 35 for support. Ring 45 is vertically movable in part 35 by pins 46, and plug 47 is vertically movable in part 36. Plug 47 is cut out on its lower end to give the desired form to the bearing head which is molded integral with the housing to close the upper end.

In operation ring 45 is lowered by allowing pins 46 to extend downwardly thru the bottom of part 35. A sufficient quantity of molding compound is then placed on top of ring 45 to form the lower or open end of the housing. A core which has been treated in mold Figure 4 and 5 as described is then placed in part 36 and the mold is closed and secured by screws 37. Inserts 40 and 41 are placed and held by plugs 39 and studs 42 respectively as shown. Sufficient molding compound is then placed in the upper end of part 36 to form the upper or closed end of the housing and plug 47 is entered in the upper end of part 36. Heat and pressure is then applied to the ends of the mold and ring 45 is forced upward and plug 47 is forced downward until the mold is closed as shown. Further heat is then applied to bake the contents of the mold after which the combined field and housing are removed in a finished state.

It is apparent that when a dynamo electric machine field and its necessary housing are combined in a unit as described, deterioration from ordinary use is indefinitely postponed, since the windings are permanently insulated and protected and the terminals secured against displacement and consequent breakage. Rivets 17 and screws 21 hold the laminæ of the core securely tied together and studs 26 extending thru the core, being threaded where they pass thru the molded heads, not only tie the laminæ together but tie the molded heads to the core forming a rigid and substantial structure. Portions of studs 26 which extend beyond the housing are intended to be used to fasten a head which carries the other necessary bearing and closes the lower open end of the housing.

A dynamo electric machine field as completed by mold, Figures 6 and 7, is sufficiently shown in the mold and is not further illustrated after removal therefrom, but in Figure 8 I show a modified form of field produced in the same manner, as it appears after removal from the mold. Stampings 22 and terminals 23, Figure 3, are replaced by stampings 48 and 49 having terminals 50 and 51 respectively, Figure 8. By this form and arrangement of the terminals I provide a field for a small motor which may be screwed into a standard lamp socket and which is particularly adapted for driving a flexible shaft at the end of which a small chuck may be placed for driving small drills, grinding wheels, erasers, etc. The insulation placed in the first mold is represented by numeral 84 and that placed in the second mold by numeral 85.

Figure 9:
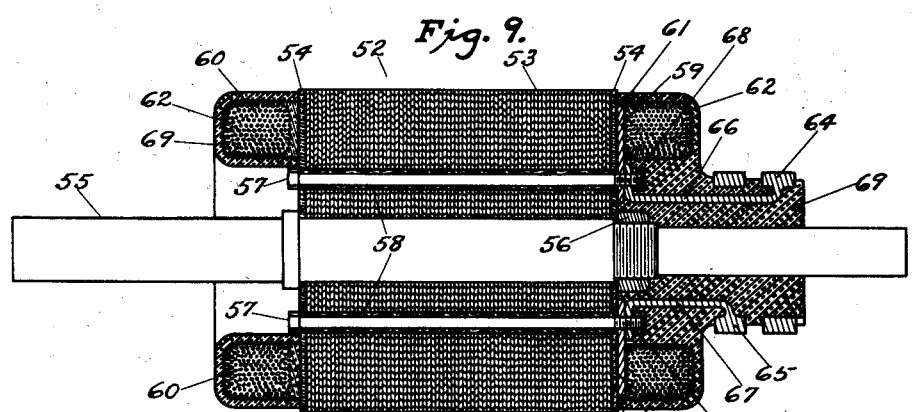
Figure 9 is a cross section thru a rotating field made according to my process.

Figure 9 is a cross section taken thru a rotating field produced by my process. A core 52 composed of iron laminæ 53 and laminæ of insulating material 54 is mounted on shaft 55 and held by nut 56. Bolts 57 passing thru tubes of insulating material 58 are screwed into metal plates 59. Coils 60 are then placed on the core and their ends electrically connected to plates 59 as at 61. The structure is then placed in an impregnating mold similar to that shown and described relative to Figures 4 and 5 and the winding and the joints to plates 59 impregnated and covered with insulation as at 62 leaving the inner ends of plates 59 exposed. Collector rings 64 and 65 having legs 66 and 67 respectively are held in electrical contact with plates 59 by nuts 68 and the structure then placed in a mold similar to that shown and described relative to Figures 6 and 7 where the heavier mass of insulation 69 is molded to cover the windings and support the collector rings.

In Figure 10 a tube 70 has openings 71 thru its wall. A coil 72 is placed within the tube, and metal terminals 73 are placed into the openings 71, leaving space between the terminals and said openings. The ends of the coil are electrically joined to terminals 73 as at 74 and 75 and the structure is then placed in a mold as described relative to Figures 4 and 5 and the coil 72 is impregnated and covered, the joints 74 and 75 covered, and the space around terminals 73 filled with liquid insulation 63, which is hardened before removing the structure from the mold. As no heavier mass of insulation is here required the structure is completed, ready for use in the one molding operation.

In Figure 11 a coil 76 is wound around a core 77. Terminal screw 78 extending thru an opening in core 77 into nut 79 grounds one end of the winding to core 77 at 80. The other end of the winding is electrically joined at 81 to terminal stud 82 which extends thru a bushing 83 of insulating material in another opening in the core. The structure is then impregnated in a mold similar to that described relative to Figures 4 and 5, and then, like the coil shown in Figure 10, used without further molding operations.

Having described my invention, I claim:—

1. A dynamo electric machine field comprising a core having winding apertures, a winding in said apertures, metallic members carrying brush pockets and metallic members carrying terminals for connection to the external circuit, means which mechanically secure said metallic members to said core yet leave them electrically insulated therefrom, joints between said winding and said metallic members and molded insulation impregnating said winding, cementing it to said core, and covering said joints.

2. A dynamo electric machine field comprising a winding and core, said core having a plurality of insulation lined apertures extending therethru, fastening means passing thru said apertures, metallic members carrying brush pockets and metallic members carrying terminals for connection to the external circuit secured by said fastening means, joints between said metallic members and said winding, and molded insulating material impregnating and cementing said winding to said core and covering said joints.

3. A dynamo electric machine element comprising a field core having an axial opening for an armature, windings on said core extending axially beyond each end, a ring of cementitious insulating material at each end of the core enclosing the windings and held thereto and to the core by adhesion only, a bearing head molded integral with one ring across one end to close said one end, and a bearing sleeve concentrically held in said bearing head.

4. In a dynamo electric machine, a housing of molded insulating material having an axially disposed cylindrical opening adapted to receive an armature, said opening being closed at one end to provide bearing support for said armature, a core of magnetic material and a winding imbedded in said housing, terminals for said winding imbedded in said housing and ending in pockets to receive brushes, and other terminals for said winding impedded in said housing and ending in the outer surface thereof for connection to the external circuit.

5. In a dynamo electric machine, a housing of molded insulating material having an axially disposed cylindrical opening adapted to receive an armature, a core of magnetic material and a winding imbedded in said housing, terminals for said winding imbedded in said housing and ending in pockets to receive brushes, and other terminals for said winding imbedded in said housing and ending in the outer surface thereof for connection to the external circuit.

6. The method of producing a dynamo electric machine element which consists in providing a core, placing a winding thereon, rigidly attaching terminals for said winding to said core, said terminals being electrically insulated from said core, electrically joining said winding to said terminals, placing the structure in a relatively close fitting mold, injecting liquid insulating material into said mold, in, between and around said winding and said joints, holding said liquid in place by means of said mold until it is hardened, to cement the several parts of the structure together and to provide a rigid covering thereon, then placing said structure into another mold, placing additional inserts to provide anchorage for brush spring caps and shaft bearings, then molding a relatively heavy armor of insulating material around and to the structure to form a housing as an integral part thereof.

7. The method of making a dynamo electric machine field element, which consists in providing a core, placing a winding thereon, rigidly attaching terminals for said winding to said core, said terminals being electrically insulated from said core, electrically joining said winding to said terminals, placing the structure in a close fitting mold, injecting liquid insulating material into said mold to impregnate and cover said winding and the joints between said winding and terminals, holding said liquid in place by means of said mold until it is hardened, then placing the structure in another mold, and molding a relatively heavy mass of insulation thru and about said winding and terminals.

8. A dynamo electric machine element comprising a core, a winding on said core extending axially therebeyond, relatively heavy terminals for said winding resting on and anchored to said core but electrically insulated therefrom, and a mass of insulation molded thru and about the winding at the end of the core, and between and about said terminals, said terminals being adapted to the twofold purpose of conveying current from the winding to the surface of the insulation mass and anchoring the insulation mass to the core.

9. A dynamo electric machine element comprising a core, a winding on said core extending axially therebeyond, studs threaded or otherwise roughened extending thru said core and axially therebeyond, and a mass of insulation molded thru and about the winding and studs, said studs extending thru and beyond one end of the insulation mass to serve the twofold purpose of a fastening means for a bearing head and a tie for holding the insulation mass to the core.

10. A dynamo electric machine field element comprising a core, a winding on said core, relatively heavy terminals for said winding mechanically joined to said core by fastening means extending into said core but electrically insulated therefrom, said winding being jointed to said terminals, and a mass of cementitious material molded in situ about said terminals, winding and core, to provide both insulation and mechanical binder for the several parts, said terminals extending thru the insulation mass for connection to the external circuit.

11. A dynamo electric machine element comprising a magnetizable core, a winding on said core, terminals for said winding mechanically secured to one end of said core but electrically insulated therefrom, said winding being electrically connected to said terminals, and a housing comprising a mass of cementitious insulation molded through and about the winding and core completely surrounding the winding and cementing it to the core and closing one end of the housing, said terminals extending through said mass at the closed end of the housing to the outer surface thereof being there formed to correspond to the terminals of an incandescent lamp.

12. A dynamo electric machine element comprising a magnetizable core, a winding on said core, a housing comprising a mass of cementitious insulation molded through and about the winding and core, completely surrounding the winding and cementing it to the core, terminals corresponding to the terminals of an incandescent lamp imbedded in the surface of the insulation mass comprising the housing, and electrical connectors extending from said winding through said mass to said terminals.

In testimony whereof, I hereunto set my hand this 27th day of June, 1927.

VINCENT G. APPLE.